United States Patent

Van Gorkom et al.

Patent Number: 5,347,199
Date of Patent: Sep. 13, 1994

[54] THIN-TYPE PICTURE DISPLAY DEVICE WITH MEANS FOR EFFECTING ELECTRON TRANSPORT BY SECONDARD EMISSION

[75] Inventors: Gerardus G. P. Van Gorkom; Petrus H. F. Trompenaars; Gerardus A. H. M. Vrijssen, all of Eindhoven, Netherlands

[73] Assignee: U.S. Philips Corporation, New York, N.Y.

[21] Appl. No.: 53,980

[22] Filed: Apr. 26, 1993

Related U.S. Application Data

[63] Continuation of Ser. No. 954,949, Sep. 30, 1992, abandoned, which is a continuation of Ser. No. 637,039, Jan. 3, 1991, abandoned, which is a continuation-in-part of Ser. No. 830,951, Feb. 6, 1992, abandoned, which is a continuation of Ser. No. 582,677, Apr. 24, 1990, abandoned.

[30] Foreign Application Priority Data

Jan. 10, 1990 [NL] Netherlands .................. 9000060
Jun. 5, 1990 [NL] Netherlands .................. 9001266
Nov. 26, 1990 [NL] Netherlands .................. 9002566

[51] Int. Cl.$^5$ .................................. G09G 3/10
[52] U.S. Cl. ........................ 315/169.1; 313/422; 313/495
[58] Field of Search ......... 313/103 R, 103 CM, 495, 313/422, 399, 400; 315/169.1, 169.3

[56] References Cited

U.S. PATENT DOCUMENTS

| | | | |
|---|---|---|---|
| 4,069,439 | 1/1978 | Anderson | 313/422 |
| 4,099,079 | 7/1978 | Knapp | 313/103 CM |
| 4,719,388 | 12/1988 | Oess | 315/169.1 |
| 4,879,496 | 11/1989 | Knapp et al. | 313/422 |
| 4,881,005 | 11/1989 | Morimoto et al. | 313/422 |

FOREIGN PATENT DOCUMENTS 400750  5/1990  European Pat. Off. .

OTHER PUBLICATIONS

Ljamitscher "Device for displaying information with flat screens", M. Radio & Communication 1983 pp. 37,36,30,135,147,154,160 and 165.

Primary Examiner—Robert J. Pascal
Assistant Examiner—Michael B. Shingleton
Attorney, Agent, or Firm—Robert J. Kraus

[57] ABSTRACT

Picture display device having a vacuum envelope with a front wall supporting a luminescent screen at its inner side and a rear wall at a short distance therefrom, connected by side walls. The envelope accommodates a plurality of adjacent electron sources and juxtaposed, local electron ducts cooperating with these sources and having walls of substantially electrically insulating material having a secondary emission coefficient which is suitable for transporting, through vacuum, produced electrons in the form of electron currents. Means are provided to make each electron current substantially travel along a particular wall of its electron duct, as well as means for withdrawing each electron current at predetermined locations from its duct and directing it towards the luminescent screen for producing a picture composed of pixels.

57 Claims, 4 Drawing Sheets

THIN-TYPE PICTURE DISPLAY DEVICE WITH MEANS FOR EFFECTING ELECTRON TRANSPORT BY SECONDARD EMISSION

This is a continuation of application Ser. No. 07/954,949, filed on Sep. 30, 1992, now abandoned which is a continuation of Ser. No. 07/637,039, filed on Jan. 3, 1991 now abandoned which application is a continuation-in-part of copending U.S. application Ser. No. 830,951 filed on 6 Feb. 1992, now abandoned which is a continuation of U.S. patent application Ser. No. 528,677 filed on 24 May 1990 now abandoned.

BACKGROUND OF THE INVENTION

The invention relates to a picture display device having a vacuum envelope for displaying pictures composed of pixels on a luminescent screen, and particularly relates to a thin picture display device (i.e. a picture display device having a small "front-to-back dimension") which is clearly distinguished from state-of-the-art display devices.

Typical state-of-the-art approximations to thin-type picture display devices are devices having a transparent face plate and a rear plate which are interconnected by means of partitions and in which the inner side of the face plate is provided with a phosphor pattern, one side of which is provided with an electrically conducting coating (the combination also being referred to as luminescent screen). If (video information-controlled) electrons impinge upon the luminescent screen, a visual image is formed which is visible via the front side of the face plate. The face plate may be flat or, if desired, curved (for example, spherical or cylindrical).

A specific category of picture display devices of the thin type uses single or multiple electron beams which initially extend substantially parallel to the plane of the display screen and are subsequently bent towards the display screen so as to address the desired areas of the luminescent screen either directly or by means of, for example, a selection grid structure. (The expression electron beam is understood to mean that the paths of the electrons in the beam are substantially parallel, or extend only at a small angle to one another and that there is a main direction in which the electrons move.) The above-mentioned devices operating with controlled electron beams require, inter alia, complicated electron-optical constructions.

Moreover, picture display devices of the single beam type generally require a complicated (channel plate) electron multiplier of the matrix type, certainly if they have slightly larger screen formats.

SUMMARY OF THE INVENTION

In view of the foregoing it is an object of the invention to provide a thin-type picture display device which substantially does not have the drawbacks of the above-mentioned devices.

According to the invention, a picture display device having a vacuum envelope for displaying pictures composed of pixels on a luminescent screen therefore comprises a plurality of juxtaposed sources for producing electrons, local electron ducts cooperating with the sources and having walls of substantially electrically insulating material having a secondary emission coefficient suitable for transporting, through vacuum, produced electrons in the form of electron currents, and means for withdrawing each electron current at predetermined (particularly successive) locations from its duct and directing it towards the luminescent screen for producing a picture composed of pixels, the electron ducts being provided with electrode means for generating, in operation, an axial electric field component $E_y$ and a transverse field component $E_x$.

The inventive approach of providing a thin-type picture display device is based on the discovery that electron transport is found to be possible when electrons are made to impinge on a wall portion of an elongate evacuated cavity (so-called compartment) defined by walls of electrically substantially insulating material (for example, glass or plastics) if an electric field of sufficient power is applied in the longitudinal direction of the compartment (e.g. by applying an electric potential difference across a longitudinal portion of the compartment). The impinging electrons generate secondary electrons by wall interaction which are attracted to a further wall portion and in their turn generate secondary electrons by wall interaction. As will be further described the circumstances (field strength, electrical resistance of the walls, secondary emission coefficient $\delta$ of the walls) may be chosen to be such that a constant vacuum current will flow in the compartment.

By withdrawing electrons at desired locations from a plurality of adjacent electron currents and directing them towards a luminescent screen, a picture can then be formed on the luminescent screen. In this case it is important that the electrons in the ducts do not have too high velocities. If a plurality of electrons were to have too high velocities during transport through the electron ducts, this could lead to loss of contrast of the picture on the screen. Too high velocities may occur due to elastic collisions with the walls (back-scattering) or because electrons starting at a low velocity do not come into contact with the walls or do not come into contact with these walls until after they have covered a substantial distance (more than several millimeters) and gain more and more energy on their way. To prevent this, the electron ducts are provided according to the invention with electrode means for producing, in operation, both an axial electric field component ($E_y$) and a transverse electric field component ($E_x$). It is thereby achieved that each electron current is confined to a longitudinal area proximate to a duct wall. As it were, the electrons "hop" across said wall during transport, which has the envisaged effect.

A first embodiment of the device according to the invention is characterized in that the electron ducts are constituted by elongate cavities defined by walls of substantially electrically insulating material having a secondary emission coefficient $\delta$, the side of each cavity facing the luminescent screen being provided with a plurality of extraction apertures such that all extraction apertures jointly constitute an arrangement of rows and columns. In this case $\delta$ and E have values which enable electron transport through the cavities. A selection means is provided by providing the apertures row-sequentially with electrodes which can be energised by means of a first (positive) electric voltage (pulse) so as to withdraw electron currents from the cavities via the apertures of a row, or they can be energised by means of a second (lower) electric voltage if no electrons should be locally withdrawn from the cavities. The electrons drawn from the cavities by this selection means can be directed towards the screen by applying an acceleration voltage. The electrode means may also be implemented to provide a (substantially linearly) increasing potential across the (rear) wall remote from the screen and a similarly (linearly) increasing, but lower potential across the (front) wall facing the screen. The field components $E_y$ and $E_x$ are created in this way. For example, the rear wall potential may be defined very well by means of a high-ohmic resistance layer provided on the rear wall. This resistance layer may have a meandering or zigzag pattern so as to increase the resistance. An alternative is to select a such material for the rear wall that it is possible to make use of the rear wall charge which is produced during and by transport of electrons. The front wall potential can be adjusted, for example, by providing a plurality of parallel, for example strip-shaped, electrodes in the electron ducts at the screen side, which electrodes can be given an approximately linearly increasing potential during operation. These electrodes may also be used to advantage for selecting a (picture) line by providing, for example, apertures in these electrodes and connecting them to a circuit for providing a (positive) selection voltage.

These electrodes may further have a multiple construction for the purpose of a satisfactory definition and contrast and/or they may be provided with electrode means which extend towards the screen and are coaxial with the apertures.

All electron currents generated by the electron sources should be guided in the electron ducts across at least a part of the height up to the level of the upper edge or of the lower edge of the luminescent screen. For this purpose one row of electron sources or a plurality of parallel rows of electron sources may be provided.

Each electron source may be placed within the electron duct with which it cooperates, but each is preferably located at the outer side opposite an entrance portion of the electron duct with which it cooperates.

By applying a sufficiently large positive voltage difference between an electron source and the entrance portion of an electron duct cooperating therewith, electrons emitted by the electron source are accelerated towards the electron duct, whereafter they generate secondary electrons in the electron duct by means of wall interaction.

In the proposed display suitable potentials force the electrons to "hop" across a wall. When driven in such a mode, the number of electrons which can reach large velocities is limited because the electrons are subjected to an electrostatic force in the direction of the wall.

In the electron ducts the electrons acquire increasing velocities which at the instant of collision with a wall approximate to velocities corresponding to an energy of 30 eV, which is equal to the energy at which the secondary emission coefficient is 1. Electrons entering a duct with a larger energy may cause contrast problems because they may move with so much energy towards the selection electrodes and the screen after back-scattering on a wall that they may overcome the counter field component ($E_x$) and thus reach the screen at undesired locations.

A preferred embodiment of the device according to the invention is characterized in that velocity restricting means are arranged between each electron source and the entrance portion of the electron duct with which it cooperates, in a manner to ensure that the emitted electrons cannot travel through the electron duct without any wall collisions.

It will make it impossible for the electrons to enter the ducts at high velocities by arranging, for example the electron emitters at an angle with respect to the walls of the electron ducts. Immediately when they enter the ducts, the electrons will collide with a wall at least once. In this way an "electron chicane" is created. An embodiment based on this idea is characterized in that the velocity restricting means includes a wall portion which is arranged in such a manner that the emitted electrons collide with it and that the secondary electrons produced during the collisions collide with a wall of the electron duct.

An electrical alternative is to have the electron emitters cooperate with drive electrodes which are arranged and energisable in such a manner that the electrons are emitted towards a wall of the entrance portion of the electron duct.

A magnetic alternative is to have the electron emitters cooperate with magnetic field producing means which generate a magnetic field with which the emitted electrons are deflected towards a wall of the entrance portion of the electron duct.

A (line) arrangement of a plurality of electron emitters parallel to (an edge of) the luminescent screen can be used for generating electron currents to be transported through the vacuum in the electron ducts. Thermal cathodes and cold cathodes such as field emitters are suitable for this purpose.

Electrons which are line-sequentially withdrawn from the electron ducts can be accelerated (as beams) towards the luminescent screen by applying a sufficiently large voltage difference between the electron ducts and the screen, for example a difference of 3 kV. One picture line at a time can thus be written. The video information (gray scales) can be presented, for example in the form of pulse width modulation. The distance to the screen may be very small so that the spot remains small. Extracted individual electron beams accelerated towards the screen can be localised by providing an electron beam localisation structure in the form of, for example, a structure of horizontal and/or vertical walls between the electron ducts and the luminescent screen.

An important aspect of the invention is that, if the electron ducts have side walls, these side walls are also used as an internal vacuum support, so that the front and rear walls of the inventive picture display device can be relatively thin as compared with those of known picture display devices of the thin type (total thickness, for example <10 mm). In this connection an embodiment is characterized in that the vacuum envelope comprises a transparent face plate whose inner side supports the luminescent screen and a rear plate arranged at a short distance from the face plate, which plates are interconnected by means of partitions, and in that the space between the face plate and the rear plate accommodates an internal vacuum support, part of which is formed by side walls of the electron ducts. Another part of the vacuum support may be formed by a system of electron beam localisation walls, which system extends between the face plate and the walls of the electron ducts at an angle with respect to the latter.

A further embodiment is characterized in that the vacuum support comprises a selection plate of electrically insulating material provided with the extraction apertures, in which the walls of the electron ducts maintain the selection plate and the rear plate spaced apart. The selection plate may be a thick plate filling the space between the electron duct walls and the face plate. Alternatively, the selection plate may be thin and an arrangement of electron beam localisation walls maintaining the face plate and the selection plate spaced apart may be located between the selection plate and the face plate. In this case the electron beam localisation walls may extend, for example transversely and/or parallel to the electron duct walls.

BRIEF DESCRIPTION OF THE DRAWING

Some embodiments of the invention will be described in greater detail with reference to the drawing in which the same reference numerals are used for corresponding components.

DESCRIPTION OF THE PREFERRED EMBODIMENTS

Figure 1:
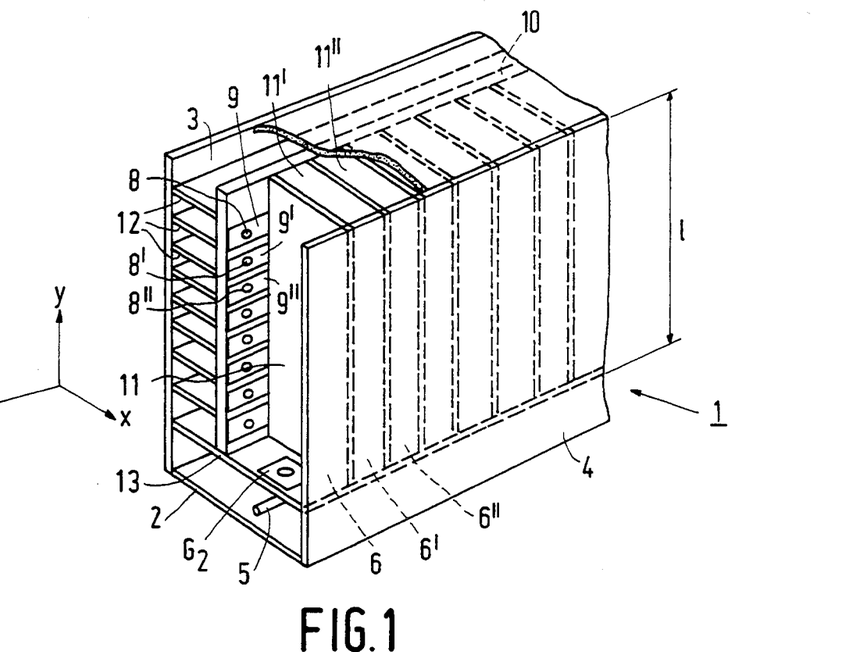
FIG. 1 is a diagrammatic perspective elevational view, partly broken away, of a part of a construction of a picture display device according to the invention whose components are not drawn to scale.
Figure 1A:
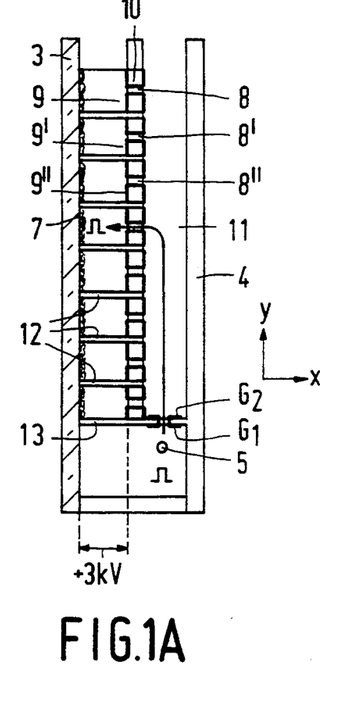
FIG. 1A is a side elevation, broken away, of the construction of FIG. 1 to illustrate the general operation of the invention.

FIGS. 1 and 1A represent a thin-type picture display device 1 according to the invention having a display panel (window) 3 and a rear wall 4 located opposite said panel. An electron source arrangement 5, for example, a line cathode which by means of electrodes provides a large number of electron emitters, for example 600, or a similar number of separate emitters is present proximate to a wall 2 which connects panel 3 and the rear wall. Each of these emitters is to provide a relatively small current, so that many types of cathodes (both cold and thermionic cathodes) are suitable as emitters. The emission is preferably controlled by means of the video signal. An alternative is to apply the video-information to a gating structure to be positioned after the electron source arrangement (which in that case may be a line-cathode). The electron source arrangement 5 is arranged opposite to entrance apertures of a row of ducts extending substantially parallel to the screen, which ducts are constituted by compartments 6, 6', 6", ... etc., in this case one compartment for each electron source. These compartments have cavities 11, 11', 11", ... defined by walls. At least one wall (preferably the rear wall) of each compartment is made of a material which has a suitably high electrical resistance for the purpose of the invention (for example, ceramic material, glass, synthetic material—coated or uncoated) and which have a secondary emission coefficient $\delta > 1$ over a given range of primary electron energies (see FIG. 3). The electrical resistance of the wall material has such a value that a minimum possible total amount of current will flow in the walls in the case of a field strength ($E_y$) in the compartments of the order of one hundred to several hundred Volts per cm, required for the electron transport. Currents as small as 1 microampere have been realised in a practical embodiment. By applying a voltage of the order of several dozen to several hundred Volts (value of the voltage is dependent on circumstances) between the row 5 of electron sources and the compartments 6, 6', 6", electrons are accelerated from the electron sources towards the compartments whereafter they impinge upon the walls in the compartments and generate secondary electrons.

The invention is based on the recognition that vacuum electron transport within compartments defined by walls of electrically substantially insulating material is possible if an electric field ($E_y$) of sufficient power is applied in the longitudinal direction of the compartment. The electric field can be adjusted to the electrons injected into the compartment an energy distribution and spatial distribution of that the effective secondary emission coefficient $\delta_{eff}$ of the walls of the compartment will be equal to 1 on average in operation. Under these circumstances one electron will leave for each electron which enters (on average), in other words, the electron current is constant throughout the compartment and is approximately equal to the current which enters. If the wall material is high-ohmic enough (which is the case for all appropriate untreated glass types as well as for KAPTON polyimid materials, PERTINAX plastic-impregnated paper materials and ceramic materials), the walls of the compartment cannot produce or take up any net current so that this current, even in a close approximation is equal to the entering current. If the electric field is made larger than the minimum value which is required to obtain $\delta_{eff}=1$, the following will happen. As soon as $\delta_{eff}$ is slightly larger than 1, the wall is charged inhomogeneously positively (due to the very small conductance this charge cannot be depleted). As a result, the electrons will reach the wall earlier on average than in the absence of this positive charge, in other words, the average energy taken up from the electric field in the longitudinal direction will be smaller so that a state with $\delta_{eff}=1$ adjusts itself. This is a favourable aspect because the exact value of the field is not important, provided that it is larger than the previously mentioned minimum value.

Another advantage is that in the state $\delta_{eff} \approx 1$ the electron current in the compartment is constant and can be made to be very satisfactorily equal via measuring and feedback or via current control for each compartment so that a uniform picture can be realised on the luminescent screen.

Figure 1B:
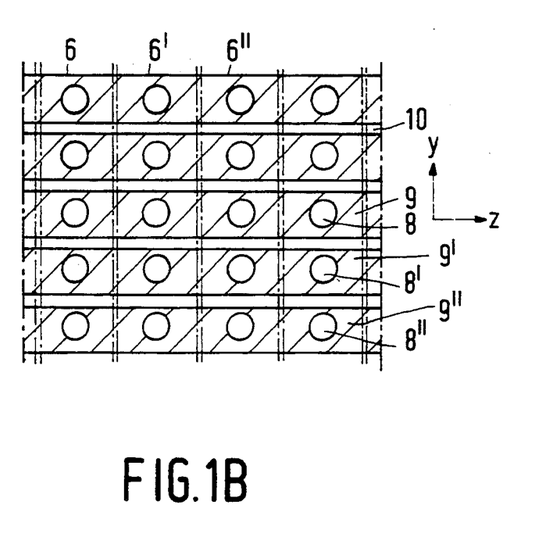
FIG. 1B shows a (selection) electrode arrangement to be used in the construction of FIG. 1, FIGS. 2A and 2B show the operation of a specific electron duct to be used in the construction of FIG. 1 with reference to a "vertical" cross-section and a voltage diagram.

The compartment walls facing the luminescent screen 7, which is arranged on the inner wall of the panel 3, are constituted by a selection plate 10 in the embodiment of FIG. 1 (see FIG. 1A). The selection plate 10 has extraction apertures 8, 8', 8", ... etc. Provided that specific provisions have been made, a "gating" structure can be used to "draw" a flow of electrons from a desired aperture when using cathodes which are not separately driven. However, individually driven cathodes are preferably used in combination with a pattern of parallel, apertured strip-shaped selection electrodes (9, 9", 9"', ...) to be energised by a selection voltage. These selection electrodes may be arranged on the surface of the plate 10 facing the rear wall 4, or on both surfaces. In the latter case opposite (apertured) selection electrodes are preferably interconnected electrically via the apertures 8, 8″, 8‴. "Horizontal" walls 12 keep the plate 10 spaced apart from face place 3 and ensure a lateral localisation of extracted electron beams. If selection electrodes are arranged on the surface of the plate 10 facing the screen 7, it is advantageous if they completely cover those areas on this surface which are located between the walls 12 (see, for example, FIG. 1A). The selection electrodes 9, 9″, 9‴, . . . may be implemented picture linewise, for example in the way shown in FIG. 1B ("horizontal" electrodes with apertures coaxial with the apertures 8, 8′, 8″, . . . ). The apertures in the electrodes will generally be at least as large as the apertures 8, 8′, 8″, . . . . If they are larger, aligning will be easier. Desired locations on the screen 7 can be addressed by means of (matrix) drive of the individual cathodes and the selection electrodes 9, 9′, 9″, . . . . Voltages which increase substantially linearly (as viewed from the cathode side) are applied to the selection electrodes 9, 9′, 9″, . . . . When a picture line must be activated, i.e. when electrons must be withdrawn via apertures in an aperture row from the columnwise arranged electron currents flowing behind them, a pulsatory voltage $\Delta U$ is added to the local voltage. In view of the fact that the electrons in the compartments have a relatively low velocity due to the collisions with the walls, $\Delta U$ may be comparatively low (of the order of, for example, 100 V to 200 V). In this case a voltage difference $V_a$ is taken across the total compartment height, which is just too small to draw electrons from apertures. This does happen by applying a positive line selection pulse of the correct value.

Figure 2A:
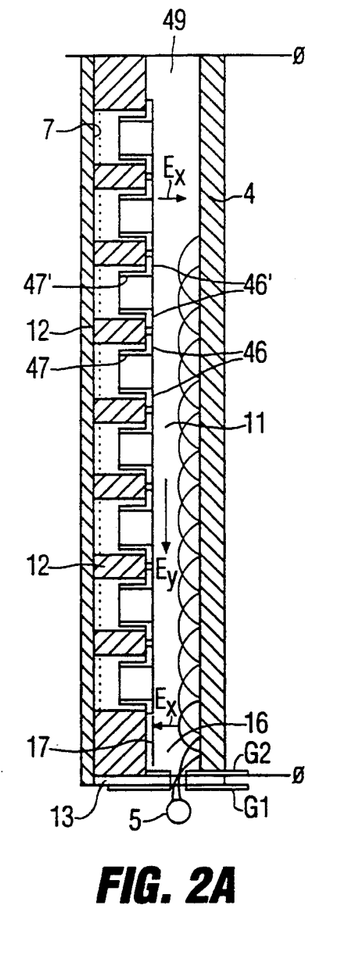

The idea of transporting electrons via "hopping" across the rear wall 4 is particularly illustrated in FIG. 2A which is a "vertical" cross-section of an alternative construction. The phenomenon of "hopping" may arise when electrons are made to impinge on an insulator (the rear wall 4) in the presence of a longitudinal field component $E_y$. A transverse field component $E_x$ is generated by charging the insulator. If an arbitrary insulator material is used, the field potentials are undefined and the "hopping" cannot be properly controlled. A low-ohmic layer could be provided on the insulator so as to define the potentials in a better way. However, this requires much power when driving the display. A more practical solution is to apply a high-ohmic resistance layer on the rear wall. Moreover, rows of electrodes 46, 46′, . . . are preferably arranged on the wall located opposite the rear wall 4. These electrodes are given a linearly increasing potential which is, however, lower than the opposite potential on the rear wall 4. This rear wall potential is adjusted by applying a voltage across the high-ohmic resistance layer provided thereon. In this way not only an axial field component $E_y$ is created but also a transverse field component $E_x$. As long as no selection voltage is applied to one of the electrodes 46, 46′, . . . the field component $E_x$ provides for a component, directed towards the rear wall 4, of the electrical force on the electrons which prevent too many electrons from acquiring high velocities. This contributes to the contrast. In an entrance portion 16 of the electron duct 11 adjacent to the cathode 5 an electrode 17 may be provided for generating the field component $E_x$ upon energisation, with which field the emitted electrons are urged towards the rear wall 4. The electrodes 46, 46′, . . . are provided with relatively large apertures to which electrical conductors in the form of cylinders 47, 47′, . . . or strips can be connected so as to prevent charge problems in the spaces where extracted electrons are drawn towards the screen 7. By applying a positive pulse voltage (selection voltage) of a sufficient value to desired electrodes 46, it is achieved that the electrons can leave the compartment cavities 11 at these locations and can be directed towards the screen 7. At these locations the field component $E_x$ reverses its direction, as is shown in FIG. 2A. For example, a wafer-shaped spacer structure whose horizontal walls 12 are visible in FIG. 2A may be arranged between the cavities 11 separated by walls 49 and the screen 7. The apertures of this wafer structure may accommodate the strip-shaped electrodes 46, 46′, . . . provided with cylinders 47, 47′, . . . in a simple manner. An alternative to such a spacer structure is a thick plate having apertures which are coaxial with the apertures in the strip-shaped electrodes 46, 46′. . . .

As described hereinbefore, lateral localisation of the electron currents proximate to the rear wall 4 can be achieved mechanically by using (vertical) partitions ("side walls") between the compartment cavities, which partitions also serve as an internal vacuum support, but lateral localisation may alternatively be achieved electrically, for example, by means of vertical electrically conducting tracks in or on the rear wall, to which suitable electrical potentials can be applied.

The necessity of providing an electrically insulating selection plate 10 (FIG. 1, 1A) with small apertures is eliminated in the construction shown in FIG. 2A. Instead, thin metal electrode strips are provided with apertures, which is a simple technique. On the other hand the apertures in these electrode strips should be mutually equal. However, the same requirement already applies to the apertures in the shadow masks of current TVs in which this problem has already been solved in a satisfactory and inexpensive manner.

Figure 2B:
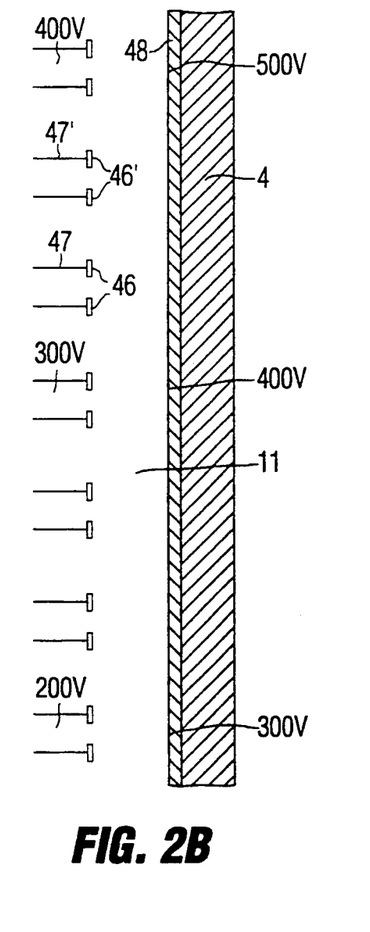

To explain the use of the construction shown in FIG. 2A, FIG. 2B shows a part of the rear wall 4 provided in this case with a high-ohmic resistance layer 48, while a plurality of strip-shaped selection electrons 46, 46″, . . . is arranged opposite this part. In operation there is a voltage difference of, for example, 200 V across the shown part of the rear wall 4, varying from 500 V at the upper side to 300 V at the lower side. The high-ohmic resistance layer 48 ensures that the voltage variation is well defined. Such a layer on the rear wall may also be advantageous in the construction shown in FIG. 1. The same voltage difference of 200 V is present across the group of selection electrodes 46, 46′, . . . facing the part of the rear wall 4, but on the understanding that a selection electrode conveying a lower voltage (a 100 V lower voltage in this case), etc. is arranged opposite a location on the rear wall conveying a voltage of 500 V. By giving, for example, the selection electrode which conveys 300 V such a voltage pulse that the voltage sufficiently exceeds the voltage on the opposite part of the rear wall, the electrons "hopping" across the rear wall of the cavity 11 can be drawn out at the location of the aperture of the selection electrode in question. In this case voltage-applying means for successively applying a selection voltage pulse to successive selection electrodes are thus used for scanning lines which are parallel to the rows of apertures. Means for individually modulating the emission of emitters cooperating with the cavities 11 may be provided for selecting pixels on a scanned picture line.

The following method of manufacturing the aforementioned high-ohmic resistance layer may be used: A glass plate is coated with a homogeneous powder layer comprising glass enamel particles and $RuO_x$ particles or similar particles. This powder layer may be given a meandering configuration, for example by means of scratching, silk-screening of photolithography; subsequently the glass plate with the powder layer is heated until the resistance layer has reached the desired resistance value. Resistances per square of the order of 10 MOhms can be realised in this way. In a practical display of the relevant type a resistance of $10^7$ to $10^{10}$ Ohms can be realised in this way across the height of the rear wall. Alternatively, a thin, possibly transparent layer of a semiconductor material such as, for example, $In_2O_3$, $SnO_x$, indium tin oxide (ITO) or antimony tin oxide (ATO) can be applied, with which the desired resistance values can also be obtained. Such a resistance layer may also be used as a voltage divider to which the selection electrodes are connected.

Figure 3:
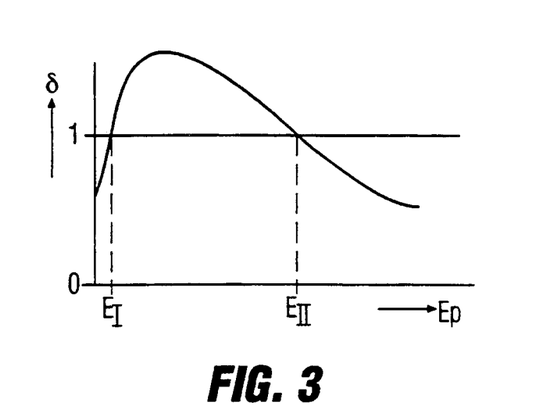
FIG. 3 shows a graph in which the secondary emission coefficient $\delta$ as a function of the primary electron energy $E_p$ is plotted for a wall material which is characteristic of the invention.

The materials to be used for the walls of the electron ducts must have a high electrical resistance and a secondary emission coefficient $\delta > 1$, see FIG. 3, at least over a certain range $E_I$-$E_{II}$ of primary electron energies $E_p$. $E_I$ is preferably as low as possible, for example, one or several times 10 eV. Inter alia, specific types of glass ($E_I$ is approximately 30 eV), ceramic material, PERTINAX materials and KAPTON materials meet this requirement. Materials which do not meet this requirement may be provided, for example with a suitable coating (of, for example, MgO).

The electrical resistance depends on whether not only electron transport but also amplification (over a part or over the total length) of the electron ducts is desired and how much total current is allowed to flow in the walls in connection with the power to be dissipated.

The mode using electron transport only is preferred. The electrical resistance between the top and bottom of the compartment may then be in the range between $10^6$ and $10^{15}$ Ω. As an alternative at least the cathode-sided portion of the electron ducts may have a relatively low resistance, for example, in the range between 10 kΩ and 100 MΩ so as to ensure amplification. At the abovementioned values the required powers are not higher than 100 W.

In a given case electron transport was realised in a compartment of lead glass with a length of 17 cm and a bore of 1 mm diameter (electrical resistance measured across the length $>10^{15}$ Ω) by applying an electric voltage of 3.5 kV across the ends.

It is further to be noted that the duct walls may consist of an electrically insulating material which has a constructive function as well as a secondary emission function. Alternatively, they may consist of an electrically insulating material having a constructive function (for example, a synthetic material), on which material a layer having a secondary emission function is provided (for example, quartz or glass or ceramic material such as MgO).

The electric voltage across the electron ducts required for electron transport increases with the length of the ducts. However, this voltage can be reduced by arranging the (line) arrangement of electron sources in the centre instead of on the "bottom" of the display device (as in FIG. 1). A voltage difference of, for example 3 kV can then be applied between the centre of the ducts and their tops so as to draw "up" the electron current and subsequently the same voltage difference can be applied between the centre and the bottom so as to draw the electron current "down", instead of applying a voltage difference of 6 kV across the height when the electron sources are arranged on the "bottom" of the display device. The use of a plurality of parallel rows of electron sources is even more advantageous in this respect.

Electrons which are drawn from an aperture in an electron duct by a selection electrode are directed (in the form of a "beam") towards the luminescent screen 7 where one picture line at a time can thus be written. The video information may be applied, for example, in the form of pulse width modulation. For example, a cathode cooperating with an electron duct can be energised for a shorter or longer time. To produce a white pixel, the cathode may be energised, for example during the entire line period in this case. An alternative is for the cathode to be constantly energised during the entire line period and to control the emission level. When using the "hop" mode described with reference to FIGS. 2A and 2B, suitable potentials force electrons to hop across a particular duct wall. When driven in such a mode, the number of electrons which can reach large velocities is limited because the electrons are subjected to an electrostatic force in the direction of the wall.

In the electron ducts the electrons acquire increasing velocities which at the instant of collision with a wall approximately correspond to an energy of 30 eV which is equal to the energy where the secondary emission coefficient is 1. Electrons which enter electron duct 11 with a larger energy, namely an energy equal to the G2 potential (which is larger than 30 eV) cause a contrast problem after back-scattering.

Figure 4:
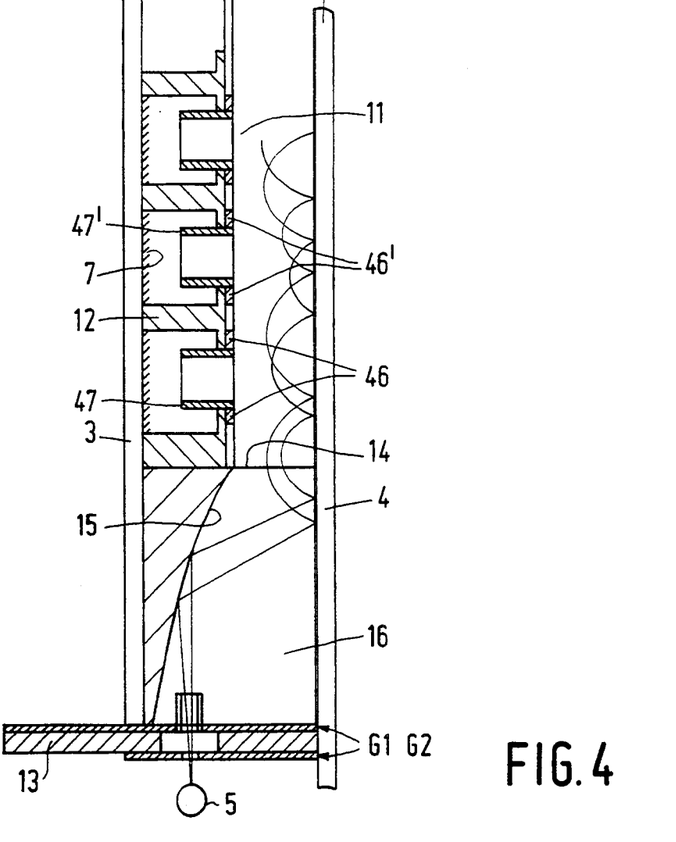
FIG. 4 is a "vertical" cross-section through a part of a construction which is an alternative to the construction of FIG. 2A.

As has been shown in FIG. 4, entrance portion 16 of electron duct 11 may be provided with an oblique wall 15 of electrically insulating or electrically conducting material, which wall faces the cathode 5 and the drive electrodes G1 and G2. This makes it impossible for the emitted electrons to enter the duct at high velocities. The electrons will impinge upon the oblique wall 15 directly after G2. The wall 15 is arranged in such a way that the entrance portion 16 is constricted towards the entrance aperture 14 of the electron duct 11. A velocity restricting "electron chicane" is created in this way.

Such a chicane can also be created in different manners, for example by implementing the configuration of drive electrodes G1 and G2 in a duct without an oblique wall portion 15 in such a way or by energising them in such a way that electrons emitted by the cathode 5 in the entrance portion 16 always impinge upon a wall. Another possibility is to have the perpendicular axis of the configuration of cathode 5 and drive electrodes G1 and G2 extend at an angle to the axis of the entrance portion 16. Entrance portion is herein understood to mean the portion of an electron duct which is not provided with extraction apertures.

Figure 5:
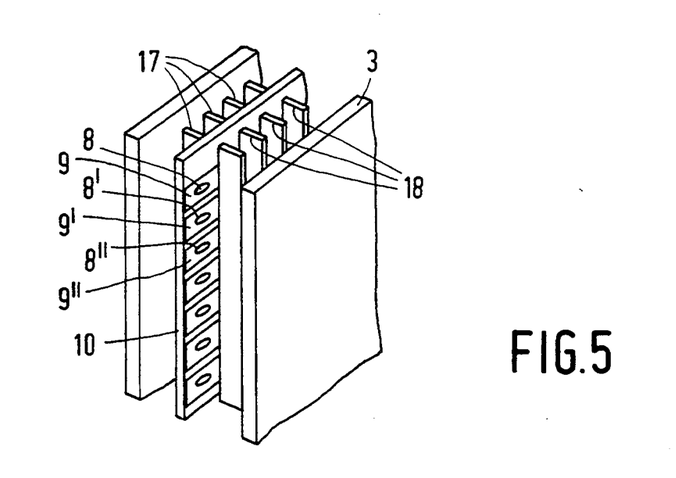
FIG. 5 shows an alternative to the construction of FIG. 1.

An electron beam withdrawn via an aperture 8 (FIG. 1) may be localised, for example, by means of "horizontal" walls 12 (FIG. 1), by means of "vertical" walls 18 (FIG. 5) or by means of a wafer-shaped wall structure (FIG. 2A). These walls may also provide the internal vacuum support. In the case of total internal vacuum support the front and rear walls may be thin ($\leq 1$ mm) so that the picture display device itself may be light in weight. Moreover, the outer dimension transverse to the screen (the depth) of the picture display device may be very small for example, 1 cm. This provides the possibility of a large number of applications, which is illustrated in the following survey:

| Pixel/size | Screen size at 575 picture lines 600 pixels/line | Screen size HDTV at 1000 picture lines | Application |
|---|---|---|---|
| 233 × 1000 μm | 40 cm × 50 cm | 69 cm × 118 cm | living room |
| 1 × 3 mm | 1.72 m × 2 m | 3 m × 5.3 m | theatre hall |
| 3.3 × 13 mm | 5.75 × 6.6 | 10 m × 17 m | stadium |

Figure 6:
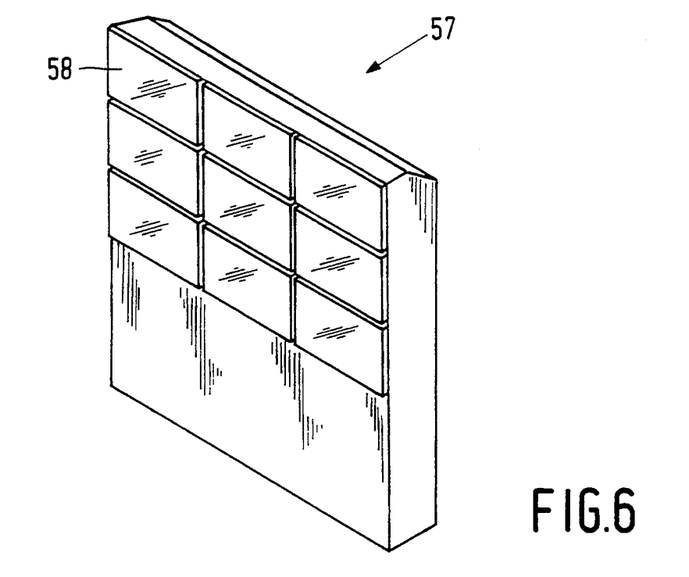
FIG. 6 shows diagrammatically a large-area flat screen display device composed of a plurality of display modules of the type according to the invention.

Due to its light weight and thin (side) walls the display device according to the invention also provides an elegant solution for a modular structure of a "large-area flat screen". In other words, as is shown in FIG. 6, a large-area flat screen display device 57 can be composed of a plurality of adjoining display devices 58 according to the invention (modules which jointly form an array having the dimensions of the desired display). The pixel (=picture element) size, pixel pitch and the distance between the pixel lines of these modules may be relatively large. Particularly, the pixel pitch and the line distances may be given such values that the pixel pattern is continued in a substantially uninterrupted way from one module to the other.

Figure 7:
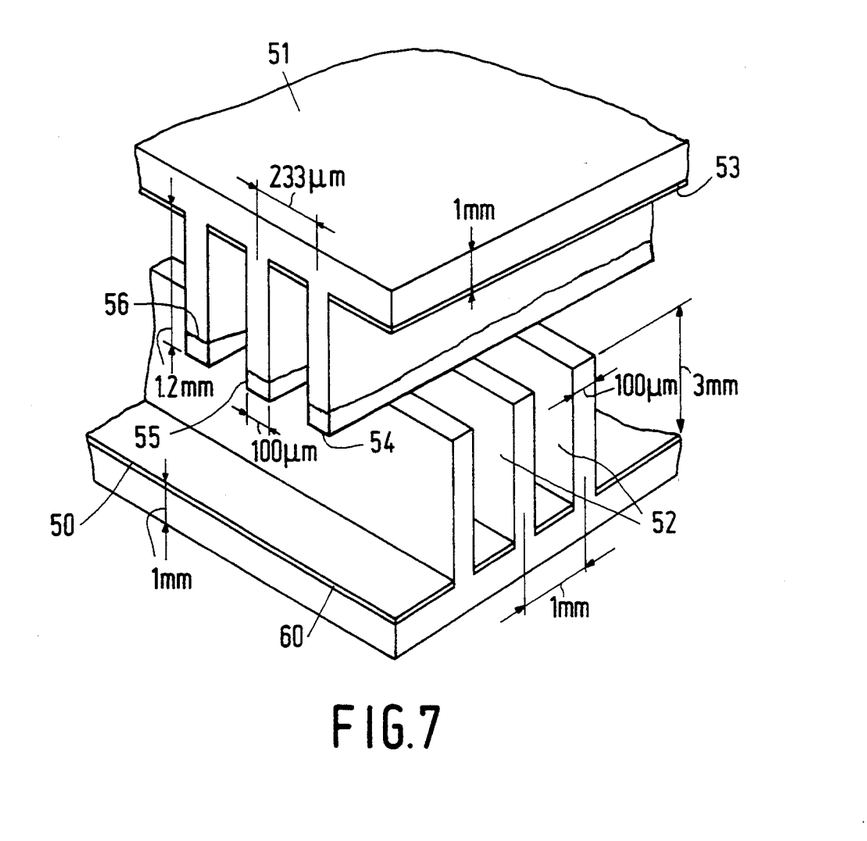
FIG. 7 shows diagrammatically an alternative picture display device according to the invention.

Such modules may have a simple structure. FIG. 7 shows an example of a part of a possible structure. The Figure shows two profiled plates 50 (rear wall) and 51 (front wall) whose profiled sides are arranged transversely onto each other. Several dimensions have been indicated by way of example in the Figure. The plates 50 and 51 may be made of a ceramic material or of glass, and the desired profiled shape is also provided during the manufacture. For example, the plate material may be provided with a binder and injection-molded. Subsequently, the binder can be heated and sintered. Alternatively, the plates can be manufactured through a sol-gel process in which, for example, $SiO_2$ gels can be made to gel in a mould. The sintering process then follows after removal and drying.

The electron ducts are formed in the spaces 52 between the raised walls of plate 50. In order to direct electrons from the ducts 52 towards desired locations on a luminescent screen 53 arranged on the inner surface of plate 51, this plate 51 has raised walls with selection tracks 54, 55, 56, . . . of electrically conducting material, which can be pairwise driven.

A high-ohmic resistance layer 60 coated, if necessary, with a layer of a material having a secondary emission which is sufficient for the object of the invention, for example, MgO, may be provided on the inner surface of plate 50. In this connection the advantage of a metal oxide-containing glass-enamel layer as a high-ohmic resistance layer is that the secondary emission of such a layer itself is generally sufficiently high for the object of the invention.

Only the plate 50 or the plate 51 may be formed in the manner described hereinbefore, while the other parts of the display device may be formed in an alternative manner.

We claim:

1. A display device comprising a luminescent screen and means for selectively energizing different areas of said screen comprising:
   a. at least one longitudinally extending electron transport duct defined by at least one wall means comprising a material having a predetermined secondary emission coefficient;
   b. electron source means for producing electrons in the at least one duct;
   c. electrode means for producing an electric field within the at least one duct to effect electron propagation along a length of said duct by means of secondary emission;
   d. means for selectively extracting electrons from predetermined locations along the length of said at least one duct; and
   e. means for directing said electrons to said screen areas; characterized in that said electrode means is constructed for producing a field component $E_y$ substantially in the longitudinal direction of the duct to effect propagation of the electrons in said longitudinal direction and for producing a field component $E_x$ substantially transverse to the longitudinal direction to promote contact of the propagating electrons with the at least one wall means before said electrons attain velocities above a predetermined magnitude.

2. A display device as in claim 1 where the means for selectively extracting electrons comprises an apertured wall of the at least one duct.

3. A display device as in claim 1 where the at least one duct includes first and second oppositely disposed walls and where the electrode means comprises first electrode means for providing a progressively increasing voltage along the length of the first wall and second electrode means for providing a progressively increasing but lower voltage along the length of the second wall.

4. A display device as in claim 3 where the first electrode means comprises a layer of resistive material disposed on the first wall and where the second electrode means comprises a plurality of electrodes disposed along the length of the second wall.

5. A display device as in claim 4 where the plurality of electrodes define respective apertures through which electrons are extracted from the at least one duct.

6. A display device as in claim 5 including means for selectively applying pulses to the plurality of electrodes to effect the extraction of electrons from at: least one selected aperture.

7. A display device as in claim 1 where the at least one duct includes an entrance portion into which electrons are emitted by the electron source means, said entrance portion including velocity restricting means which is positioned to ensure that emitted electrons collide with the at least one wall means.

8. A display device as in claim 7 where the velocity restricting means comprises a wall portion which is arranged such that the emitted electrons collide with it and produce secondary electrons directed toward collisions with the at least one wall means of the duct.

9. A display device comprising a luminescent screen and means for selectively energizing different areas of said screen, characterized in that said means comprises at least one longitudinally extending transport duct including a secondary emissive material, electron source means for introducing electrons into the at least one transport duct, first means for promoting generation of electrons within the at least one transport duct by secondary emission, second means for establishing a transport electric field for said electrons, and third means for extracting electrons from said at least one duct at selected locations to selectively energize said screen areas, said first means comprising electrically resistive material disposed along the duct for establishing a predefined potential distribution along the longitudinal direction of said at least one wall during operation to promote contact of electrons being transported in the duct with the secondary emissive material.

10. A display device as in claim 9, where said electrically resistive material is on an inner surface of the at least one duct wall.

11. A display device as in claim 9 where said predefined potential distribution substantially prevents longitudinal acceleration of said electrons being transported within the at least one duct.

12. A display device as in claim 9 where the at least one duct includes a pair of facing walls which are spaced apart by a duct width that is on the order of 1 mm.

13. A display device as in claim 9 where the at least one wall is a rear wall of the at least one duct, said rear wall being opposed by a front wall of the duct comprising electrically insulating material, a plurality of strip-shaped electrodes being arranged on a screen side of the front wall.

14. A display device as in claim 9 where the at least one wall is a rear wall of the at least one duct and where, opposite to the rear wall, a plurality of strip-shaped electrodes provided with apertures is arranged at a screen side of the duct.

15. A display device as in claim 9 where the at least one wall is a rear wall of the at least one duct and where said rear wall is opposed by a front wall of electrically insulating material, a plurality of strip-shaped electrodes being arranged on said front wall, the means for establishing the predefined potential distribution and the plurality of strip-shaped electrodes being energizable for producing, during operation, a potential difference between the front wall and the rear wall.

16. A display device as in claim 9 where the at least one duct has a rear wall and opposing first and second side walls, each of said side walls having a dimension in a direction transverse to the longitudinal direction which is substantially larger than a spacing between said side walls.

17. A display device as in claim 16 where the first and second side walls are substantially parallel to each other and extend transversely from the rear wall.

18. A display device as in claim 9 where the at least one duct comprises a plurality of ducts.

19. A display device as in claim 18 where said ducts have side walls extending transversely to the at least one wall, said side walls occurring at a pitch on the order of one millimeter.

20. A display device as in claim 9 where at least one wall of the at least one transport duct comprises an electrically insulating material on which is disposed a layer of secondary electron emitting material.

21. A display device as in claim 20 where the layer of secondary electron emitting material is selected from the group of glass, quartz and ceramic materials.

22. A display device as in claim 20 where the layer of secondary electron emitting material comprises MgO.

23. A display device as in claim 9 where the at least one duct includes an entrance portion through which the introduced electrons enter the duct and electrode means disposed adjacent the entrance portion for establishing an electric field to urge the entering electrons toward the at least one wall.

24. A display device as in claim 9 or 18 where said at least one duct includes a first wall and second and third walls extending from said first wall, all of said walls being integrally formed by a single body of material.

25. A display device as in claim 24 where the body comprises a plate of moldable material.

26. A display device as in claim 25 where the moldable material includes at least one of the materials glass and ceramic.

27. A display device as in claim 25 where the material comprises a sintered mixture of a binder and at least on of the materials glass and ceramic.

28. A display device as in claim 25 where the material comprises a sintered $SiO_2$ gel.

29. A display device as in claim 9 where the at least one duct includes an entrance portion through which the introduced electrons enter the duct in a predetermined direction and a wall member inclined with respect to said direction for redirecting the entering electrons toward the at least one wall.

30. A display device as in claim 9 including a predefined path along which the electrons travel during introduction into the at least one transport duct and deflection means disposed proximate said predefined path for deflecting said electrons toward the at least one wall.

31. A display device as in claim 9 where the electrically resistive material is disposed on an inner surface of the at least one wall.

32. A display device as in claim 9 or 31 where the electrically resistive material comprises a high ohmic resistance layer.

33. A display device as in claim 32 where the electrically resistive material comprises a metal-oxide-containing glass-enamel material.

34. A display device as in claim 33 where the first means comprises the electrically resistive material, said material having a secondary electron emission coefficient sufficient to promote said generation of electrons within the at least one transport duct.

35. A display device as in claim 34 where the metal oxide comprises ruthenium oxide.

36. A display device comprising a luminescent screen and means for selectively energizing different areas of said screen comprising:
 a. at least one longitudinally extending electron transport duct defined by at least one wall means comprising a material having a predetermined secondary emission coefficient;
 b. electron current means for establishing the propagation of electrons within the at least one duct by secondary emission from the material, said electron current means including field producing means for establishing an electric field within the at least one duct, said electric field having a first component $E_y$ substantially in the longitudinal direction of the duct to effect propagation of the electrons in said longitudinal direction and having a second field component $E_x$ substantially transverse to the longitudinal direction to promote contact of the propagating electrons with the at least one wall means before said electrons attain velocities above a predetermined magnitude;
 c. means for selectively extracting electrons from predetermined locations along the length of said at least one duct; and
 d. means for directing said electrons to said screen areas.

37. A display device as in claim 36 where the at least one duct has a rear wall and opposing first and second side walls, each of said side walls having a dimension in a direction transverse to the longitudinal direction which is substantially larger than a spacing between said side walls.

38. A display device as in claim 37 where the first and second side walls are substantially parallel to each other and extend transversely from the rear wall.

39. A display device as in claim 36 where the at least one duct comprises a plurality of ducts.

40. A display device as in claim 39 where said ducts have side walls extending transversely to the at least one wall, said side walls occurring at a pitch on the order of one millimeter.

41. A display device as in claim 36 where the at least one wall means comprises an electrically insulating material on which is disposed a layer of secondary electron emitting material.

42. A display device as in claim 41 where the layer of secondary electron emitting material is selected from the group of glass, quartz and ceramic materials.

43. A display device as in claim 41 where the layer of secondary electron emitting material comprises MgO.

44. A display device as in claim 36 where the electron current means includes an electron source means for providing electrons to the at least one duct, said duct including an entrance portion through which the provided electrons enter the duct and electrode means disposed adjacent the entrance portion for establishing an electric field to urge the entering electrons toward the at least one wall means.

45. A display device as in claim 36 or 39 where said at least one duct includes a first wall and second and third walls extending from said first wall, all of said walls being integrally formed by a single body of material.

46. A display device as in claim 45 where the body comprises a plate of moldable material.

47. A display device as in claim 46 where the moldable material includes at least one of the materials glass and ceramic.

48. A display device as in claim 46 where the material comprises a sintered mixture of a binder and at least on of the materials glass and ceramic.

49. A display device as in claim 46 where the material comprises a sintered $SiO_2$ gel.

50. A display device as in claim 36 where the electron current means includes an electron source means for providing electrons to the at least one duct, said duct including an entrance portion through which the provided electrons enter the duct in a predetermined direction and a wall member inclined with respect to said direction for redirecting the entering electrons toward the at least one wall.

51. A display device as in claim 36 where the electron current means includes an electron source means for providing electrons to the at least one duct, said display device including a predefined path along which the electrons travel during provision to the at least one transport duct and deflection means disposed proximate said predefined path for deflecting said electrons toward the at least one wall means.

52. A display device as in claim 36 where the field producing means includes an electrically resistive material disposed on the at least one wall means.

53. A display device as in claim 52 where the electrically resistive material is disposed on an inner surface of the at least one wall means.

54. A display device as in claim 52 or 53 where the electrically resistive material comprises a high ohmic resistance material.

55. A display device as in claim 54 where the electrically resistive material comprises a metal-oxide-containing glass-enamel material.

56. A display device as in claim 55 where the metal oxide comprises ruthenium oxide.

57. A display device as in claim 53 where the electrically resistive material has a secondary electron emission coefficient which is sufficient for establishing said propagation of electrons within the at least one transport duct by secondary emission.

* * * * *

UNITED STATES PATENT AND TRADEMARK OFFICE
CERTIFICATE OF CORRECTION

PATENT NO. : 5,347,199

DATED : September 13, 1994

INVENTOR(S) : Van Gorkom et al.

It is certified that error appears in the above-indentified patent and that said Letters Patent is hereby corrected as shown below:

Column 14, line 11, change "on" to --one--.

Column 16, line 2, change "on" to --one--.

Signed and Sealed this

Twenty-seventh Day of August, 1996

Attest:

BRUCE LEHMAN

*Attesting Officer*     *Commissioner of Patents and Trademarks*